US011474322B2

(12) United States Patent
Murakami

(10) Patent No.: US 11,474,322 B2
(45) Date of Patent: Oct. 18, 2022

(54) LENS APPARATUS AND IMAGING APPARATUS HAVING THE SAME

(71) Applicant: CANON KABUSHIKI KAISHA, Tokyo (JP)

(72) Inventor: Yasushi Murakami, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 335 days.

(21) Appl. No.: 16/778,390

(22) Filed: Jan. 31, 2020

(65) Prior Publication Data
US 2020/0249414 A1 Aug. 6, 2020

(30) Foreign Application Priority Data
Feb. 6, 2019 (JP) .............................. JP2019-019309

(51) Int. Cl.
*G02B 7/02* (2021.01)
*G03B 17/12* (2021.01)
(52) U.S. Cl.
CPC ............. *G02B 7/022* (2013.01); *G03B 17/12* (2013.01)
(58) Field of Classification Search
CPC ................................. G02B 7/022; G03B 17/12
See application file for complete search history.

(56) References Cited

U.S. PATENT DOCUMENTS

| 2014/0022652 | A1* | 1/2014 | Ouchi | G02B 7/023 |
| | | | | 359/819 |
| 2018/0180835 | A1* | 6/2018 | Shima | G02B 7/022 |
| 2020/0049932 | A1* | 2/2020 | Wei | G02B 7/022 |
| 2020/0209507 | A1* | 7/2020 | Wei | G02B 7/022 |
| 2020/0292916 | A1* | 9/2020 | Huang | G03B 11/00 |
| 2021/0141291 | A1* | 5/2021 | Hirata | G02B 7/021 |

FOREIGN PATENT DOCUMENTS

JP 2012173366 A 9/2012

* cited by examiner

*Primary Examiner* — Clayton E. LaBalle
*Assistant Examiner* — Diana Hancock
(74) *Attorney, Agent, or Firm* — Rossi, Kimms & McDowell LLP

(57) ABSTRACT

A lens apparatus includes a fixing member, a barrel member configured to hold a lens, and a press member configured to press the lens. The barrel member includes a fixed portion fixed to the fixing member, a screwing portion screwed on the press member, and an engagement portion engaged with the press member. The fixed portion is disposed at the same phase as the engagement portion in a circumferential direction of the lens. The screwing portion is disposed at a phase different from the engagement portion in the circumferential direction.

8 Claims, 5 Drawing Sheets

LENS APPARATUS AND IMAGING APPARATUS HAVING THE SAME

BACKGROUND OF THE INVENTION

Field of the Invention

The present invention relates to a lens apparatus and an imaging apparatus.

Description of the Related Art

One conventional lens barrel fixes a lens by engaging the lens with a barrel member and by pressing the lens using an annular press ring. Japanese Patent Laid-Open No. ("JP") 2012-173366 discloses a lens holding structure for fixing a lens by engaging the lens with a barrel member and by screwing down an outer diameter of an annular press ring and an inner diameter of the barrel member.

In the lens holding structure disclosed in JP 2012-173366, a fixed portion provided on the outer diameter of the barrel member to the fixing member may be deformed by the tightening force of the press ring. When the barrel member is made stronger so as to prevent the fixed portion from being deformed, the barrel member becomes thicker and the lens barrel becomes larger.

SUMMARY OF THE INVENTION

The present invention provides a lens apparatus and an imaging apparatus having the same, each of which can suppress a deformation of a fixed portion provided on a barrel member to a fixing member while its size is maintained.

A lens apparatus according to one aspect of the present invention includes a fixing member, a barrel member configured to hold a lens, and a press member configured to press the lens. The barrel member includes a fixed portion fixed to the fixing member, a screwing portion screwed on the press member, and an engagement portion engaged with the press member. The fixed portion is disposed at the same phase as the engagement portion in a circumferential direction of the lens. The screwing portion is disposed at a phase different from the engagement portion in the circumferential direction. An imaging apparatus having the above lens apparatus also constitutes another aspect of the present invention.

Further features of the present invention will become apparent from the following description of exemplary embodiments with reference to the attached drawings.

DESCRIPTION OF THE EMBODIMENTS

Figure 1:
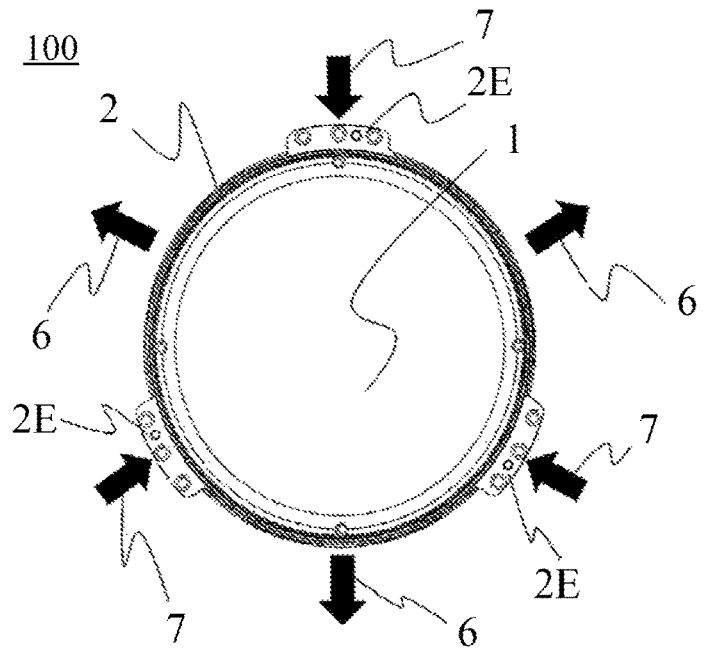
FIG. 1 is a rear view of a lens barrel according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

Figure 2:
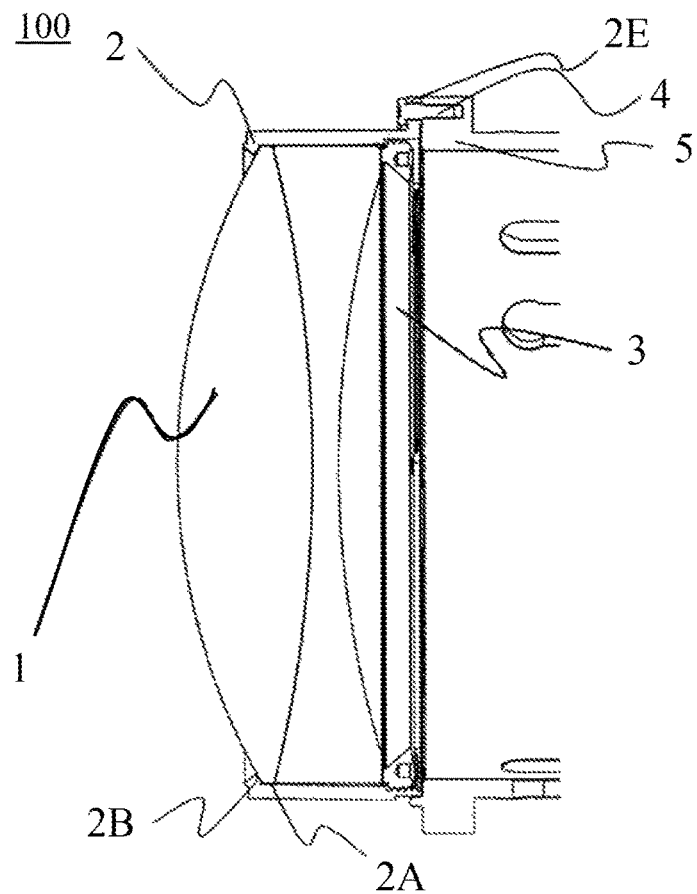
FIG. 2 is a sectional view of the lens barrel according to the first embodiment.
Figure 3:
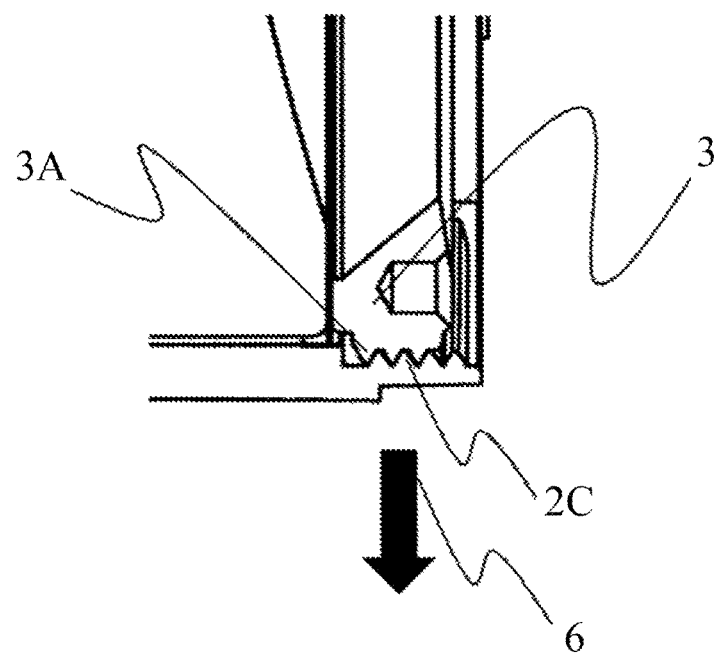
FIG. 3 is an enlarged sectional view of the lens barrel according to the first embodiment.
Figure 4:
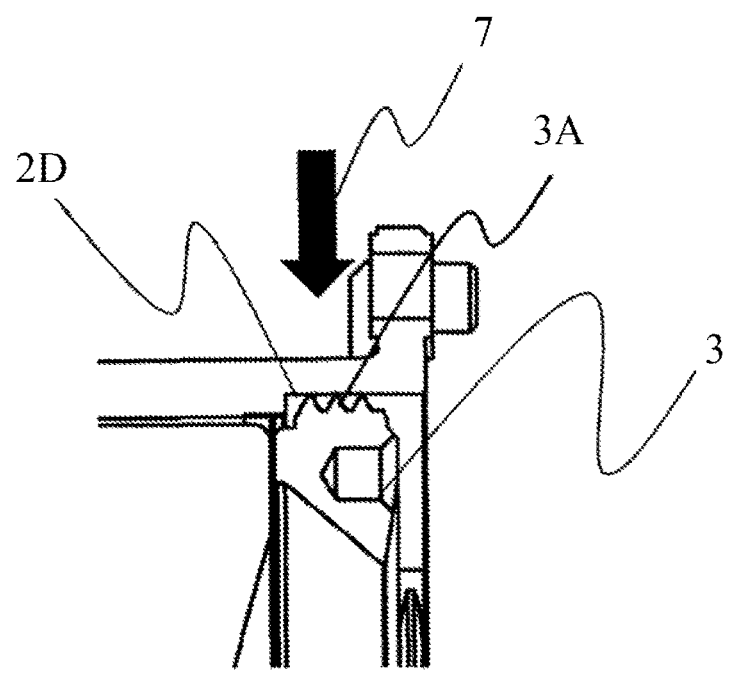
FIG. 4 is an enlarged sectional view of the lens barrel according to the first embodiment.

FIG. 1 is a rear view of a lens barrel (lens apparatus) 100 according to this embodiment. FIG. 2 is a sectional view of the lens barrel 100. FIGS. 3 and 4 are enlarged sectional views of the lens barrel 100. The lens barrel 100 includes a barrel member 2, a press ring 3, and a fixing member 5. The barrel member 2 is a resin molded component and holds a lens 1. The press ring 3 is a metal molded component, is screwed on the barrel member 2, and contacts the lens 1 in the optical axis direction of the lens 1 to hold (fix) it. The fixing member 5 fixes the barrel member 2 with screws 4.

Figure 5:
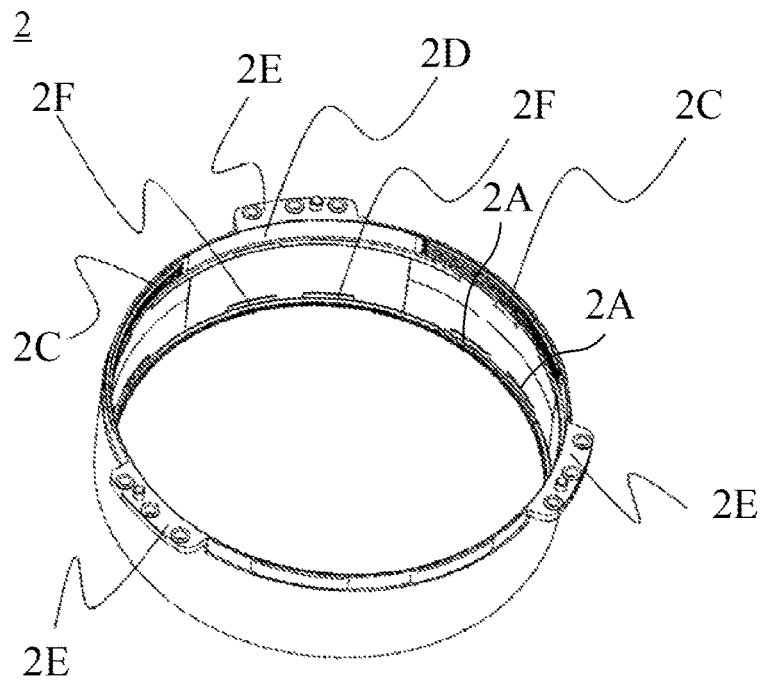
FIG. 5 is a perspective view of a barrel member according to the first embodiment.

FIG. 5 is a perspective view of the barrel member 2. The barrel member 2 includes an engagement portion (inserted or fitting portion) 2A that is engaged with the outer diameter (outer circumference) of the lens 1 and a contact surface 2B that receives the lens 1 in the optical axis direction. The barrel member 2 includes a sub-engagement portion 2F that can be engaged with the outer diameter (outer circumference) of the lens 1 when deformed as described later. The barrel member 2 further includes a screwing portion 2C screwed on a screwing portion 3A of the press ring 3 as illustrated in FIG. 3, and an engagement portion 2D provided in an absent area of the screwing portion 2C and engaged with the screwing portion 3A without being screwed with it as illustrated in FIG. 4. In this embodiment, the screwing portion 2C and the engagement portion 2D are provided on the inner side of the barrel member 2 in the radial direction. The barrel member 2 is fixed to the fixing member 5 at fixed portions 2E. Each fixed portion 2E is disposed at the same phase of that of the engagement portion 2D.

Herein, that "the fixed portion 2E is disposed at the same phase as that of the engagement portion 2D" means that "there is a straight line that is orthogonal to the optical axis of the lens 1 and passes both the fixed portion 2E and the engagement portion 2D.

A description will now be given of a holding method of the lens 1 in order of assembling the lens barrel 100. First, the lens 1 is housed in the engagement portion 2A and brought into contact with the contact surface 2B. Next, the screwing portion 3A is screwed onto the screwing portion 2C, and the press ring 3 is tightened until it comes into contact with the lens 1. Next, the fixed portion 2E is fixed to the fixing member 5 with the screws 4.

As described above, since the barrel member 2 is a resin molded component, its strength is lower than that of the press ring 3 which is a metal molded component. Thus, when the barrel member 2 is tightened with the press ring 3, the screwing portion 3A is not deformed by the tightening force of the press ring 3, but the screwing portion 2C may be deformed in arrow 6 directions. When the screwing portion 2C is deformed in the arrow 6 directions, the barrel member 2 is deformed outward so that the phases of the screwing portions 2C become apexes of a triangle as illustrated in FIG. 1. As the screwing portions 2C deform, the engagement portions 2D are likely to deform in arrow 7 directions. However, the engagement portion 2D is engaged with the screwing portion 3A, and thus the deformation amount can be suppressed by the engagement backlash. Since the deformation of the engagement portion 2D is suppressed, the deformation of the fixed portion 2E disposed at the phase of the engagement portion 2D can also be suppressed. Thereby, it is possible to fix the barrel member 2 to the fixing member 5 while the deformation of the fixed portion 2E is suppressed without causing poor assembly.

The engagement portion 2A and the contact surface 2B may be disposed at the phase of the screwing portion 2C. Thereby, the lens 1 can be more firmly held.

The screwing portion 2C and the fixed portion 2E may overlap each other in the optical axis direction. Thereby, the lens barrel 100 can be maintained small.

There may be three or more engagement portions 2D and three or more fixed portions 2E, and the phases of the engagement portions 2D and fixed portions 2E are equally divided. Thereby, a deformation of the fixed portion 2E can be further suppressed. It is unnecessary to strictly divide them into equal parts, and substantially equal parts (approximately equal parts) are permitted.

As described above, the configuration according to this embodiment can suppress a deformation of the fixed portion 2E provided on the barrel member 2 to the fixing member 5 while maintaining the size of the lens barrel 100.

Second Embodiment

Figure 6:
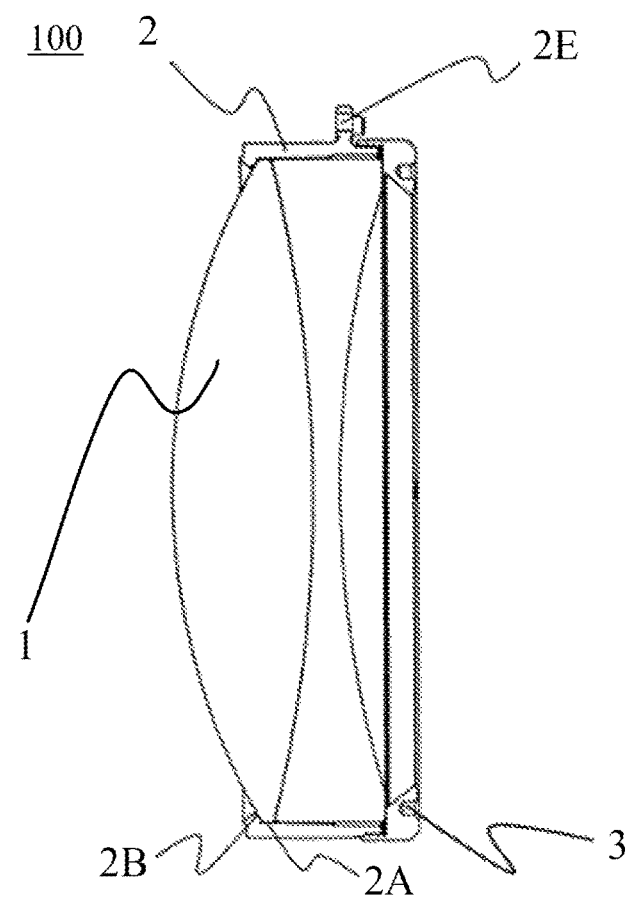
FIG. 6 is a sectional view of a lens barrel according to a second embodiment.
Figure 7:
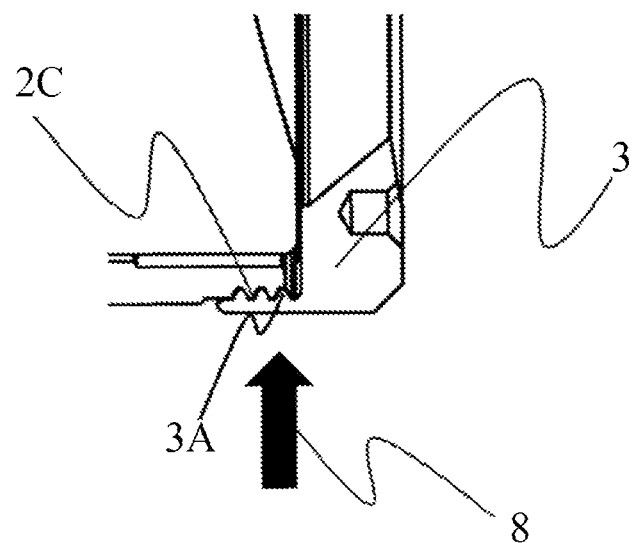
FIG. 7 is an enlarged sectional view of the lens barrel according to the second embodiment.
Figure 8:
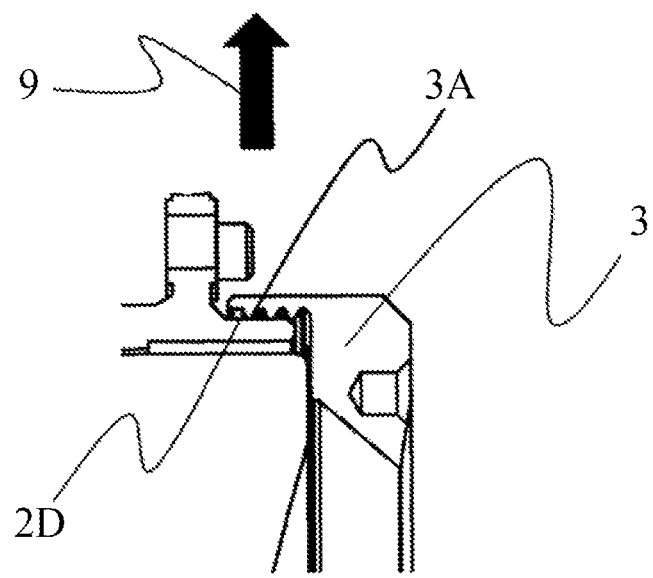
FIG. 8 is an enlarged sectional view of the lens barrel according to the second embodiment.

FIG. 6 is a sectional view of the lens barrel 100 according to this embodiment. FIGS. 7 and 8 are enlarged sectional views of the lens barrel 100. This embodiment will discuss only differences from the first embodiment, labels common portions with the same reference numerals, and omits a description of them.

In this embodiment, the screwing portion 2C and the engagement portion 2D are provided on the outer side of the barrel member 2 in the radial direction, and the screwing portion 3A is provided on the inner side of the press ring (press member) 3 in the radial direction. The screwing portion 3A is screwed with the screwing portion 2C as illustrated in FIG. 7, and engaged with the engagement portion 2D as illustrated in FIG. 8.

A description will be given of a holding method of the lens 1 in order of assembling the lens barrel 100. First, the lens 1 is housed in the engagement portion 2A and brought into contact with the contact surface 2B. Next, the screwing portion 3A is screwed with the screwing portion 2C, and the press ring 3 is tightened until it comes into contact with the lens 1. Next, the fixed portion 2E is fixed to the fixing member 5 with the screws 4 from the optical axis direction.

As described above, since the barrel member 2 is the resin molded component, its strength is weaker than that of the press ring 3 which is the metal molded component. Therefore, when the barrel member 2 is tightened with the press ring 3, the screwing portion 3A is not deformed by the tightening force of the press ring 3, but the screwing portions 2C may be deformed in arrow 8 directions. When the screwing portions 2C are deformed in the arrow 8 directions, the barrel member 2 is deformed inwardly so that the phases of the screwing portions 2C are apexes of a triangle. As the screwing portion 2C deforms, the engagement portions 2D are likely to deform in arrow 9 directions. However, the engagement portion 2D is engaged with the screwing portion 3A, and thus the deformation amount can be suppressed by the engagement backlash. Since the deformation of the engagement portion 2D is suppressed, the deformation of the fixed portion 2E disposed at the phase of the engagement portion 2D can also be suppressed. Thereby, the barrel member 2 can be fixed to the fixing member 5 while the deformation of the fixed portion 2E is suppressed without causing poor assembly.

As described above, the configuration according to this embodiment can suppress the deformation of the fixed portion 2E provided on the barrel member 2 to the fixing member 5 while maintaining the size of the lens barrel 100.

Third Embodiment

Figure 9:
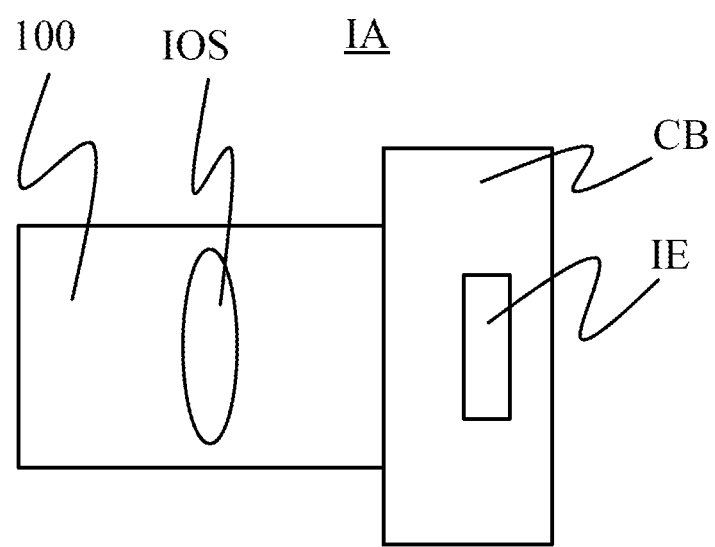
FIG. 9 is a schematic view of an imaging apparatus having the lens barrel according to the first or second embodiment.

FIG. 9 is a schematic diagram of an imaging apparatus IA including the lens barrel 100 according to the first or second embodiment. The lens barrel 100 holds an imaging optical system IOS. A camera body CB holds an image sensor IE. The image sensor IE photoelectrically converts an optical image formed through the lens barrel 100. The lens barrel 100 may be integrated with the camera body CB, or may be detachably attached to the camera body CB. The lens barrel 100 may hold the image sensor IE.

The above embodiment can provide a lens apparatus and an imaging apparatus having the same, each of which can suppress a deformation of a fixed portion provided on a barrel member to a fixing member without increasing the size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-019309, filed on Feb. 6, 2019, which is hereby incorporated by reference herein in its entirety.

What is claimed is:

1. A lens apparatus comprising:
a fixing member;
a barrel member configured to hold a lens; and
a press member configured to press the lens,
wherein the barrel member includes a plurality of fixed portions fixed to the fixing member, and a plurality of screwing portions screwed on the press member, and
wherein, when viewed from a direction parallel to an optical axis of the lens, each of the plurality of screwing portions is disposed between the plurality of fixed portions in a circumferential direction of the lens.

2. The lens apparatus according to claim 1,
wherein the barrel member further includes a contact surface configured to contact the lens, and
wherein, when viewed from the direction parallel to the optical axis of the lens, the contact surface is disposed in a same direction as a direction from the optical axis to each fixed portion of the plurality of fixed portions.

3. The lens apparatus according to claim 1, wherein the plurality of screwing portions and the plurality of fixed portions are disposed at the same position in the optical axis direction of the lens.

4. The lens apparatus according to claim 1, wherein the plurality of screwing portions includes three or more screwing portions, the plurality of screwing portions being equally disposed in the circumferential direction of the lens.

5. The lens apparatus according to claim 1, wherein the plurality of fixed portions includes three or more fixed portions.

6. The lens apparatus according to claim 1, wherein each screwing portion of the plurality of screwing portions is disposed inside the barrel member in a radial direction of the lens.

7. The lens apparatus according to claim 1, wherein each screwing portion of the plurality of screwing portions is disposed outside the barrel member in a radial direction of the lens.

8. An imaging apparatus comprising:
a lens apparatus; and
an image sensor configured to receive light from the lens apparatus,
wherein the lens apparatus includes:
   a fixing member;
   a barrel member configured to hold a lens; and
   a press member configured to press the lens,
   wherein the barrel member includes a plurality of fixed portions fixed to the fixing member, and a plurality of screwing portions screwed on the press member, and
   wherein, when viewed from a direction parallel to an optical axis of the lens, each of the plurality of screwing portions is disposed between the plurality of fixed portions in a circumferential direction of the lens.

* * * * *